United States Patent [19]

Fatchett

[11] Patent Number: 5,382,082
[45] Date of Patent: Jan. 17, 1995

[54] SEAT PEDESTAL
[75] Inventor: Robert P. Fatchett, Warsaw, Ind.
[73] Assignee: Haimbaugh Enterprises, Inc., Warsaw, Ind.
[21] Appl. No.: 948,149
[22] Filed: Sep. 18, 1992
[51] Int. Cl.⁶ .................................. A47C 4/02
[52] U.S. Cl. .................... 297/440.22; 248/159
[58] Field of Search ................... 297/440, 440.22; 248/159, 158, 346

[56] References Cited
U.S. PATENT DOCUMENTS 3,989,300 11/1976 Henmann ........................... 297/440
4,754,943 7/1988 Froutzis ........................... 248/346 X
4,789,126 12/1988 Rice et al. .
5,183,314 2/1993 Lorbiecki ........................... 297/440

Primary Examiner—Michael F. Trettel
Attorney, Agent, or Firm—Lundy & Associates

[57] ABSTRACT

An improved detachable seat pedestal that can be secured to both a vehicle seat and the floor of a vehicle. The pedestal includes a base plate and a seat support. The base plate is adapted to be secured to the floor of the vehicle. The seat support is adapted to be secured to a vehicle seat. The base plate and seat support have aligning devices and attaching devices which allow the seat and the seat support to be removed from the base plate and the vehicle as desired.

15 Claims, 3 Drawing Sheets

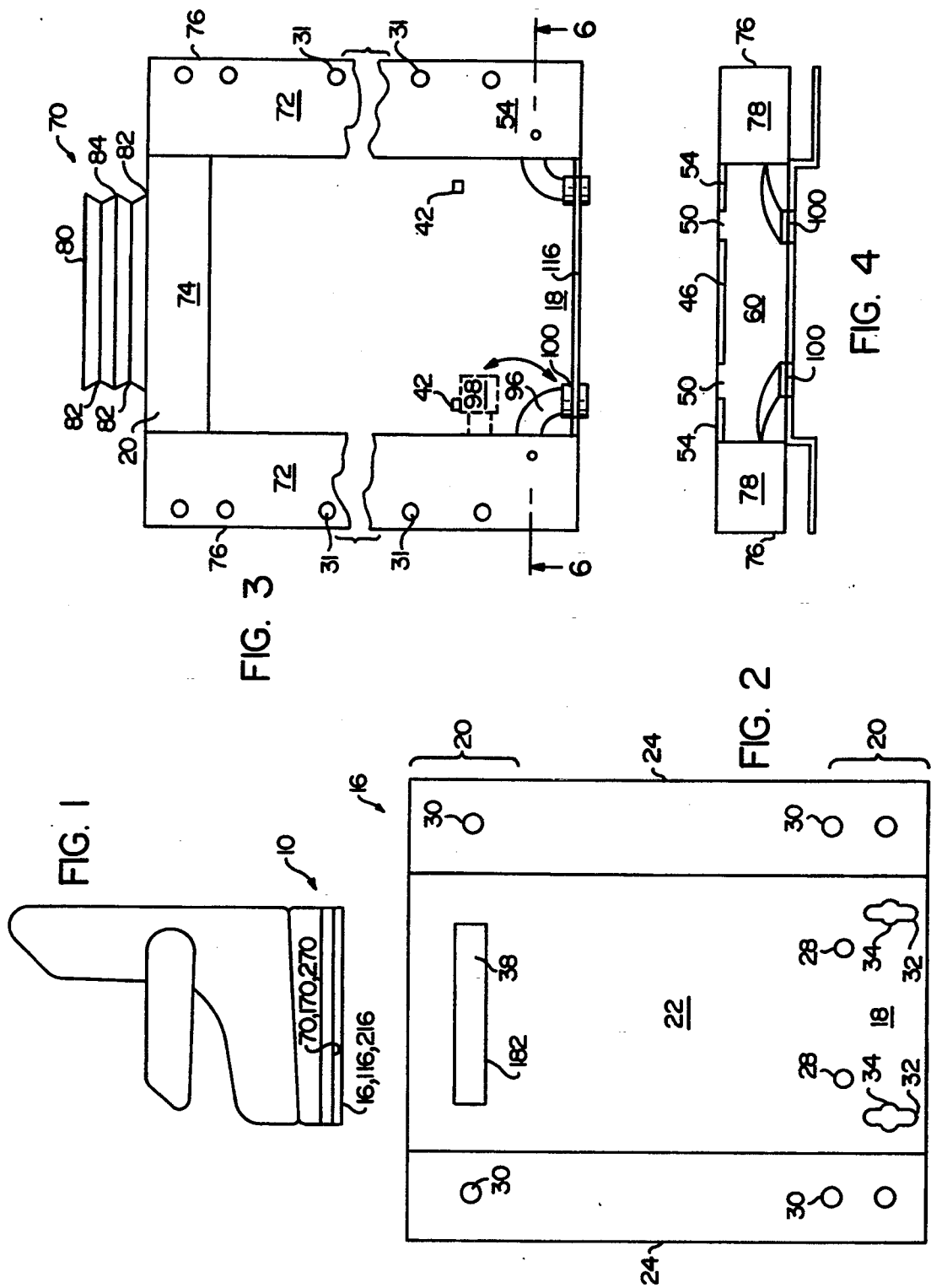

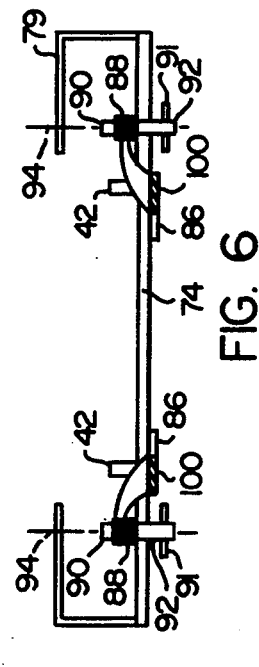
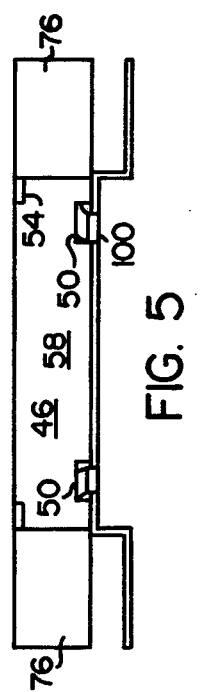
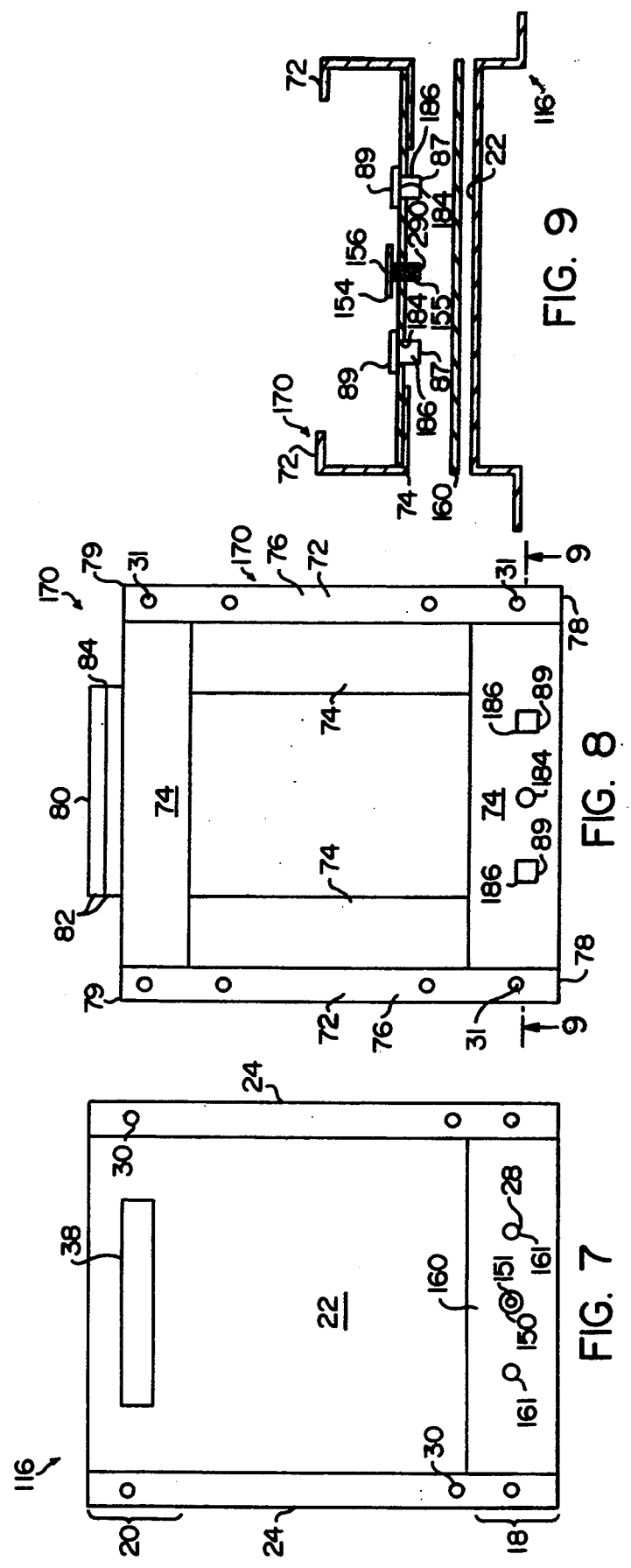

SEAT PEDESTAL

BACKGROUND OF THE INVENTION

The present invention pertains to seat pedestals and more particularly pertains to vehicle seat pedestals.

Vehicle seat pedestals are secured to the floor of vehicles and a seat is mounted to the pedestals. Seat pedestals position vehicle seats so that drivers and passengers can be comfortably seated in a position, an altitude and an attitude that allows them to see optimally through the windows of the vehicle in accordance with applicable safety standards. Previous seat pedestals, like the one disclosed in U.S. Pat. No. 4,789,126 have a flat base plate and a stem that extends upwardly from the base. The seat is mounted on the upper portion of the stem. These pedestals are relatively complex in structure, have numerous parts, and are relatively expensive to manufacture.

Recently, pick-up trucks, vans, and mini vans have become extremely popular. Most of these vehicles have removable rear seats. Others have removable intermediate seats. By removing the seats, these vehicles can be used to haul cargo rather than passengers. However, these seats require detachable seat pedestals by which the seats can be removed from the vehicle. These detachable seat pedestals must now meet the new Federal vehicle safety requirements.

It is therefore highly desirable to provide an improved detachable seat pedestal.

It is also highly desirable to provide an improved detachable seat pedestal which can enable vehicle and seat manufacturers to meet the new safety requirements without redesigning their seats or respective vehicles.

It is also highly desirable to provide an improved detachable seat pedestal which can be utilized with all available seats and all available vehicles.

It is also highly desirable to provide an improved detachable seat pedestal which will not interfere with tilt and swivel mechanisms now used on seats.

It is also highly desirable to provide an improved detachable seat pedestal which has a total of two parts excluding fasteners, both of which can be manufactured from sheet steel using simple bending, cutting, and punching manufacturing operations.

It is also highly desirable to provide an improved detachable seat pedestal which has minimal parts and is simple in construction and relatively inexpensive to manufacture.

It is also highly desirable to provide an improved detachable seat pedestal that is simple and convenient to use.

It is finally highly desirable to provide an improved detachable seat pedestal which meets all of the above desired features.

SUMMARY OF THE INVENTION

It is therefore an object of the invention to provide an improved detachable seat pedestal.

It is also an object of the invention to provide an improved detachable seat pedestal which can enable vehicle and seat manufacturers to meet the new safety requirements without redesigning their seats or respective vehicles.

It is also an object of the invention to provide an improved detachable seat pedestal which can be utilized with all available seats and all available vehicles.

It is also an object of the invention to provide an improved detachable seat pedestal which will not interfere with tilt and swivel mechanisms now used on seats.

It is also an object of the invention to provide an improved detachable seat pedestal which has a total of two parts excluding fasteners, both of which can be manufactured from sheet steel using simple bending, cutting, and punching manufacturing operations.

It is also an object of the invention to provide an improved detachable seat pedestal which has minimal parts and is simple in construction and relatively inexpensive to manufacture.

It is also an object of the invention to provide an improved detachable seat pedestal that is simple and convenient to use.

It is finally an object of the invention to provide an improved detachable seat pedestal which meets all of the above desired features.

In the broader aspects of the invention there is provided an improved detachable seat pedestal that can be secured to both a vehicle seat and the floor of a vehicle. The pedestal includes a base plate and a seat support. The base plate is adapted to be secured to the floor of the vehicle. The seat support is adapted to be secured to a vehicle seat. The base plate and seat support have aligning devices and attaching devices which allow the seat and the seat support to be removed from the base plate and the vehicle as desired.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 1 is a side view of a vehicle seat mounted to the improved detachable seat pedestal of the invention showing the base plate and seat support of the invention.

FIG. 2 is a top view of a detachable version of the improved base plate of the invention.

FIG. 3 is a top view of the detachable version of the improved seat support of the invention showing the handles in an open position (dotted) and a closed position (solid).

FIG. 4 is a front view showing the base plate illustrated in FIG. 2 with the seat support illustrated in FIG. 3 positioned thereon with the gate in an open position.

FIG. 5 is a front view of the base plate illustrated in FIG. 2 with the seat support illustrated in FIG. 2 positioned thereon and the gate in a closed position with the handles in a locked position.

FIG. 6 is a cross-sectional view of the base plate of FIG. 3 taken substantially along section line 6—6.

FIG. 7 is a top view of a modified improved detachable base plate of the invention.

FIG. 8 is a top view of a modified detachable seat support of the invention.

FIG. 9 is an exploded cross-sectional view of the base plate and seat support of FIGS. 7 and 8 taken essentially along the section line 9—9 of FIG. 8 illustrating the assembly of the seat pedestal of the invention.

DESCRIPTION OF A SPECIFIC EMBODIMENT

Figure 11:
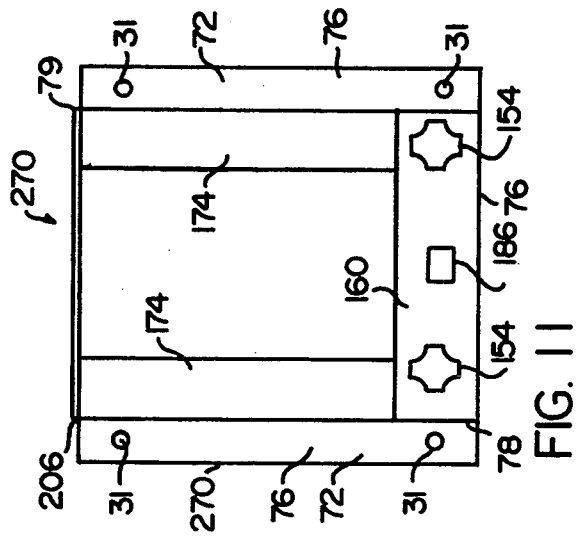
FIG. 11 is a top view of another modified detachable seat support of the invention.

The seat pedestal 10 of the invention has a base plate 16 and seat support 70. In specific embodiments, each is made of folded and welded sheet steel or similar metal and are strong enough to adequately support a vehicle seat 12 and its occupant.

Referring to FIGS. 2–6, base plate 16 is shown to be provided with a generally rectangular elevated surface 22 and a pair of elongated side flats 24. Elevated surface 22 is higher than and between elongated side flats 24. Side flats 24 extend longitudinally of surface 22 and have bores 30 that can receive bolts (not shown) to secure base plate 16 to the floor of a vehicle. Surface 22 is thus elevated from the floor of the vehicle. Surface 22 has a front portion 18 and a rear portion 20. Rear portion 20 has a generally rectangular alignment slot 38 extending through base plate 16. Front portion 18 of surface 22 has a pair of oppositely disposed alignment bores 28 therein and a pair of oppositely disposed securance bores 32 with enlarged portions 34.

Seat support 70, as shown in FIGS. 3–6, has opposite elevated side portions 76 connected by bottom plate 74. Side portions 76 are essentially rectangular and dimensioned the same as side flats 24. Side portions 76 have a plurality of bores 31 therein by which the vehicle seat 12 can be mounted to seat support 70.

Plate 74 has an elongated alignment flat 80 extending rearwardly and generally downwardly therefrom. Alignment flat 80 has at least two bends 82 which form a trough 84. Alignment flat 80 bas slightly smaller dimensions in the transverse direction of support 70 than slot 38 of base plate 16 so that seat support 70 can be placed on base plate 16 and aligned therewith by alignment flat 80 positioned in slot 38. In the specific embodiment illustrated, base plate 16 and seat support 70 have essentially tbe same exterior dimensions and shape when viewed from a top plan view so that when combined and in their aligned position, the pedestal of the invention has the same exterior dimensions and shape as base plate 16 and seat support 70 when similarly viewed.

Referring now to FIGS. 3 and 6, bottom plate 74 of opposite side portions 76 have a pair of oppositely disposed alignment lugs 86 extending downwardly therefrom adjacent front portion 78 and remote from flat 80. Alignment lugs are sligbtly smaller in diameter than, but positioned to be coaxial with alignment bores 28 of base plate 16 when alignment flat 80 is in slot 38 and seat support 70 is positioned on and aligned with base plate 16. Extending upwardly from bottom plate 74 is a pair of oppositely disposed stops 42 in opposite side portions 76. A pair of oppositely disposed locking posts are rotatably seated in front portion 78 of bottom plate 74 adjacent stops 42. Locking posts 88 each have a head 90 and a deformed shank 92. Locking posts 88 with head 90 and shank 92 define an axis of rotation 94 which is generally perpendicular to bottom plate 74 of base support 70. In the embodiment illustrated, shanks 92 are deformed by a transaxial bore with a pin 91 therein. Shanks 92 with transaxial pins 91 therein have slightly smaller dimensions than deformed bores 30 with enlarged portions 34 in base plate 16. Shanks 92 are positioned to be coaxial with bores 30, 34 in base plate 16 when seat support 70 is positioned on base plate 16 and aligned therewith. Handles 100 are secured to shanks 92 for rotating locking posts 88 from a locked position 96 to open position 98 as shown in FIG. 3.

Gate 46 is hingedly secured by hinges 54 to front portion 78 of side portions 76. Gate 46 is movable betweea a closed position 58 shown in FIG. 5 and an open position 60 as shown in FIG. 4 respectively. Gate 46 has openings 50 with the dimensions slightly larger than handles 100 in which handles 100 can be positioned to define their locked position 96. Stops 42 are positioned to abut handles 100 in open position 98 to define position 98.

Referring to FIGS. 7–9, a modified detachable seat pedestal is shown to have a base plate 116 and a seat support 170. Base plate 116 has a generally planar elevated surface 22 positioned between elongated side flats 24. Side flats 24 have bores 30 that can receive bolts (not shown) whereby base plate 116 can be secured to the floor of a vehicle. Elevated surface 22 as a rectangularly shaped alignment slot 38 extending through its rear portion 20 and a pair of alignment bores 28 and a central bore 150 positioned therebetween extending through its front portion 18. Central bore 150 has internal threads 151. In a specific embodiment, base plate 116 is made of sheet steel or similar metal and is essentially identical to the base plate 16 shown in FIG. 3 except for the relocation of holes 28 and the substitution of bore 150 for enlarged holes 30, 34.

Seat support 170 as shown in FIGS. 8 and 9, has opposite side portions 76 connected by a bottom plate 174. Side portions 76 are essentially rectangular and dimensioned the same as side flats 24. Side portions 76 have a plurality of bores 31 therein by which the vehicle seat 12 can be mounted to seat support 170.

Bottom plate 174 has elongated alignment flat 80 extended rearwardly and generally downwardly therefrom. Alignment flat 80 of seat support 170 and alignment slot 38 of base plate 116 of seat support 170 are essentially identical to base plate 16 and base support 70, as will be seen hereinafter, except for the positioning of alignment lugs 186 and securing member 154.

Bottom plate 174 of seat support 170 has a pair of oppositely disposed downwardly extending alignment lugs 186 each with a shank 87 and a lug head 89 remote from alignment flat 80 and adjacent the front 78 of seat support 170. Bottom plate 174 also has a securing member opening 184 extending therethrough between alignment lugs 186. Seat support 170 is adapted to be positioned on base plate 116 in an aligned condition with alignment flat 80 in alignment slot 38 and with shanks 87 positioned in bores 28 of base plate 16. In this position, lug heads 89 are contiguous with bottom plate 174. For convenience, lug heads 89 can be spot welded to bottom plate 174, as desired.

A resiliently compressible divider 160 with holes 161 coaxial of holes 28 and 184 is positioned between front portions 78, 18 of seat support 170 and base plate 116. Divider 160 is generally the shape of an elongated strip as shown in FIGS. 7 and 8.

In this position, securing member opening 184 can be positioned above and aligned with central bore 150, and securing member opening 184 and central bore 150 can receive a securing member 154. Securing member 154 has knob 156 and a shank with external threads 155 chosen to reciprocally engage internal threads 151, thus making base support 170 securable to base plate 116 with divider 160 compressed therebetween.

Referring now to FIGS. 10-13, another modified detachable seat pedestal 10 is shown. This seat pedestal, like the others, has a base plate 216 and a seat support 270. Base plate 216 has a generally planar elevated surface 22 positioned between elongated side flats 24. Side flats 24 have bores 30 which are adapted to receive bolts (not shown) whereby base plate 216 can be secured to the floor of a vehicle. Elevated surface 22 has a depending plate portion 128 from which a plurality of pins 230 extend. Pins 230 thus extend from the rear portion 20 of base plate 216. Alignment pins 230 take the place of the alignment slots 38 of the other embodiments as will be explained hereinafter. Adjacent front portion 18 of base plate 216 is an alignment hole 232 and two threaded bores 234. Hole 232 and bores 234 take the place of alignment bores 28 and central bore 150 in the embodiment shown in FIGS. 7-9.

Figure 13:
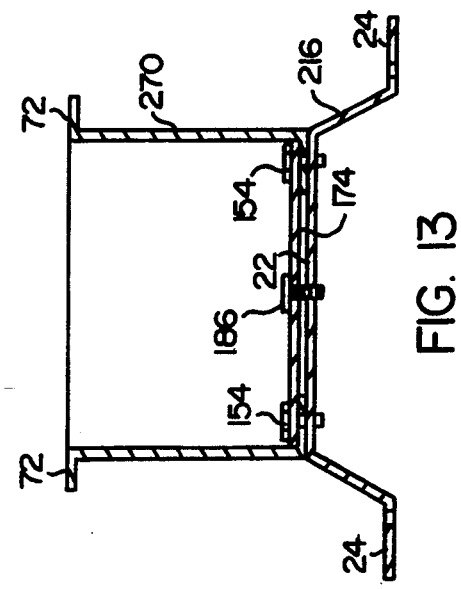
FIG. 13 is a cross-sectional view of the base plate and seat support of FIGS. 10, 11 and 12 of the improved detachable seat pedestal of the invention taken essentially along the section line 13—13 of FIG. 12.
Figure 10:
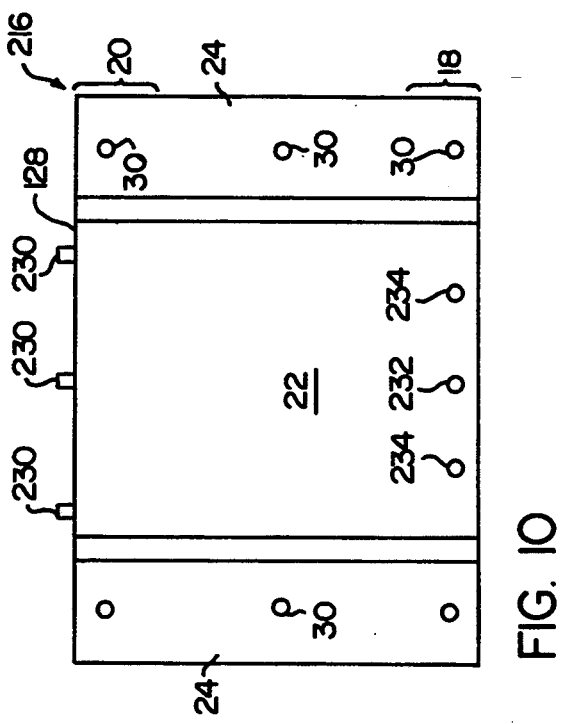
FIG. 10 is a top view of another modified base plate of the invention.
Figure 12:
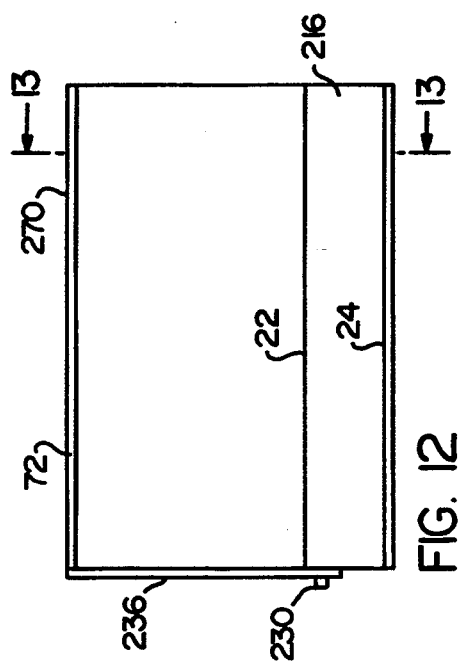
FIG. 12 is a side plan view of the base plate and seat support shown in FIGS. 10 and 11 illustrating the seat pedestal of the invention.

Seat support 270 has a top 172 and a bottom 174 as shown in FIGS. 11-13. Bottom 174 has a depending sheet portion 236 having a plurality of spaced apart holes (not shown) which are sized and spaced apart so as to receive pins 230 when the seat support 270 is positioned on the base plate 216 in an aligned condition. When the pins 230 are in the holes of depending plate 236 and the seat support 170 is positioned on the base plate 216, base plate 216 is contiguous with seat support 270. Seat support 270 adjacent front 78 has an alignment lug 186 which extends through bore 232 when positioned on base plate 216 and aligned as afore-described. Seat support 270 also has a pair of securing members 154 with depending knobbed handles 156 and threaded shanks 290. Shanks 290 extend through front 78 of seat support 270 when properly aligned and positioned on base plate 216 and into threaded bores 234 so as to secure seat support 270 on base plate 216.

As in the embodiments previously illustrated, an elastic divider 116 with appropriate holes coaxial with holes 232 and 234 is positioned between base plate 216 and seat support 270.

In specific embodiments, base plates 16, 116 and 216 and seat supports 70, 170 and 270 shown in FIGS. 2-6, 7-9, and 10-13 are each essentially identical except for the substitution of alignment members 28, 80, locking posts 88, lugs 86, 186 and securing means 154. In all embodiments herein, like parts are given like reference numerals.

In use, assembly of the seat pedestal 10 may be performed relatively simply. Base plates 16, 116 and 216 abd seat supports 70, 170 and 270 are secured to the floor of a vehicle using bolts (not shown).

The vehicle seat 12 selected including its tilt and swivel mechanisms is positioned and secured to seat supports 70, 170 and 270 in accordance with all Federal regulations.

Seat supports 70, 170 and 270 are positioned on base plates 16, 160 and 260 in an aligned condition with alignment flat 80 positioned in slot 38 and alignment pins 230 in their corresponding holes in base plate 216. Once the rear portion 20 of the base plate and seat supports are in alignment, front portions 78 of seat supports 70, 170 and 270 can then be aligned with front portions 18 of base plates 16, 160 and 260. Alignment bores 28 in surface 22 of base plates 16, 160 and 260 receive alignment lugs 86, 186 and 286 of seat supports 70, 170 and 270.

Once front and rear portions 18, 20 of base plates 16, 160 and 260 are aligned with front and rear portions 78, 79 of seat supports 70, 170 and 270 they are secured together by locking posts 88 and securing members 154.

Seat supports 70, 170 and 270 allow its owner to quickly and easily remove the entire vehicle seat 12 for storage, cleaning or to create more room within his vehicle, as desired, by reversing the process.

The seat pedestal 10 of the invention provides an improved universal base 14 and a quickly and conveniently removable base support 70, 170 whereby vehicle seat 12 can be conveniently removed for cleaning or extra storage in the vehicle. Seat pedestal 10 of the invention provides vehicle manufacturers with a cost effective means for complying with the new safety requirements which mandate that a designated standardly sized occupant be located in a specific position ("H" position) within the vehicle. Additionally, because of its universal base 14, seat pedestal 10 will not interfere with the tilt and swivel mechanisms now existing on seats and can be utilized with all available seats and all available vehicles. The seat pedestal 10 of the invention positions the vehicle seat at the desired altitude, attitude and position and can be produced and manufactured inexpensively.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A universal pedestal for a vehicle seat comprising a base plate and a seat support, said seat support being positioned over and secured to said base plate, said seat support being adapted to be secured to a vehicle seat, said base plate having an upwardly facing surface with front and rear portions, said base plate having a pair of elongated side flats adapted to be secured to the floor of a vehicle, said upwardly facing surface being higher than said flats, said seat support having a fastener and a latch removably securing said base plate and seat support together whereby said seat support and base plate can be separated and secured together as desired, said seat support having a top and bottom and opposite sides, said top and bottom having front and rear portions, said fastener comprises a single hook portion at said rear portion of said bottom, said book portion being engagable with said base plate by sliding said seat support over said base plate toward an aligned position in which said seat support is superimposed on said base plate, said latch being enggable between said seat support and said base plate when said base plate is in said aligned position.

2. The pedestal of claim 1 wherein said seat support and said base plate are integrally formed of sheet steel.

3. The pedestal of claim 1 further comprising a vehicle seat secured to one of a group consisting of said seat support and one or more of said intermediate elements as desired, said seat having a tilt mechanism and a swivel mechanism.

4. The pedestal of claim 1 wherein said fastener includes a pair of oppositely disposed alignment detents extending between said base plate and said seat support.

5. The pedestal of claim 1 wherein said latch is a threaded fastener.

6. The universal pedestal of claim 1 wherein said hook portion comprises an elongated alignment flat extending rearwardly and generally downwardly from said rear portion of said bottom, said base plate having an elongated slot, said elongated slot extending through said rear portion of said surface whereby said flat can be positioned in said slot when said seat support is supported over said base plate and slid rearwardly thereof into said aligned position.

7. The universal pedestal of claim 1 wherein said hook portion comprises an elongated flat extending downwardly from said rear portion of said bottom, said base plate having at least one pin extending rearwardly thereof, said flat having at least one opening therein for receiving said pin when said seat support is supported over said base plate is slid forwardly thereof into said aligned position.

8. The universal pedestal of claim 1 further comprising a tilt mechanism and a swivel mechanism, said tilt mechanism and swivel mechanism being secured to said seat support between said seat and said seat support.

9. The universal pedestal of claim 1 wherein said latch is a pair of lugs, said lugs extending downwardly from said front of said bottom, said lugs having threads.

10. The universal pedestal of claim 1 wherein said latch is a pair of threaded fasteners.

11. A universal pedestal for a vehicle seat comprising a base plate and a seat support, said seat support being positioned over and secured to said base plate, said seat support being aoapted to be secured to a vehicle seat, said base plate having an upwardly facing surface with front and rear portions and a pair of elongated side flats adapted to be secured to the floor of a vehicle, said surface being higher than said flats, said seat support having a fastener and latch removably securing said base plate and seat support together whereby said seat support and said base plate can be separated and secured together as desired, said seat support having a top and a bottom and opposite sides, said top and bottom having front and rear portions, said latch includes a pair of oppositely disposed locking posts, said posts having a head and a deformed shaft respectively, said shafts extending downwardly through said bottom, said locking posts defining an axis of rotation, said axis being generally perpenoicular to said bottom, said locking posts being rotatably seated in said front portion of said bottom, said posts being rotatable between a locked position and an open position.

12. The pedestal of claim 11 wherein said base plate has a pair of oppositely disposed bores with enlarged portions extending through said front portion of said surface, said bores with said enlarged portions having dimensions slightly larger than said shafts when said posts are in said open position, said shafts with said deformations pass freely through said enlarged portions respectively when in said open position, and when said posts are in said locked position said deformations do not pass freely through said enlarged portions respectively, thereby removably securing said seat support to said Base plate.

13. The universal pedestal for a vehicle seat comprising a base plate and a seat support, said seat support being positioned over and secured to said base plate, said seat support being adapted to be secured to a vehicle seat, said base plate having a surface with front and rear portions, and a pair of elongated side flats adapted to be secured to the floor of a vehicle, said seat support having a fastener and latch removably securing said base plate and said base support together, a vehicle seat secured to said seat support, said seat having a tilt mechanism and a swivel mechanism, said seat support having a top and a bottom and opposite sides, said top and bottom having front and rear portions, said sides being spaced apart and generally parallel, a pair of oppositely disposed alignment detents extending between said base plate and said seat support, said fastener comprising an elongated alignment flat extending rearwardly and generally downwardly from said rear portion of said bottom, said plate having an elongated slot, said slot extending through said rear portion of said surface, said latch being a pair of lugs; said lugs extending downwardly from said front of said bottom, said lugs having threads.

14. A universal pedestal for a vehicle seat comprising a base plate and a seat support, said seat support being positioned over and secured to said base plate, said seat support being adapted to be secured to a vehicle seat, said base plate having a surface with front and rear portions, and a pair of elongated side flats adapted to be secured to the floor of a vehicle, said surface being higher than said flats, said seat support having a fastener and latch removably securing said base plate and seat support together whereby said seat support and said base plate can be separated and secured together as desired, said seat support having a top and a bottom and opposite sides, said top and said bottom having front and rear portions, said fastener having an elongated alignment flat extending rearwardly and generally downwardly from said rear portion of said bottom, said base plate having an elongated slot, said slot extending through said rear portion of said surface whereby said flat can be positioned in said slot when said base support is supported over said base plate in an aligned position, said latch having a pair of oppositely disposed locking posts, said posts having a head and a deformed shaft respectively, said shafts extending downwardly through said bottom, said locking posts defining an axis of rotation, said axis being generally perpendicular to said bottom, said locking posts being rotatably seated in said frorot portion of said bottom, said posts being rotatable between a locked position and an open position, said base plate having a pair of oppositely disposed bores with enlarged portions extending through said front portion of said surface, said bores with said enlarged portions having dimensions slightly larger than said shafts when said posts are in said open position and said base support is in said aligned position, said shafts with said deformations pass freely through said enlarged portions respectively when in said open position, and when said posts are in said locked position said deformations do not pass freely through said enlarged portions respectively, thereby removably securing said seat support to said base plate, each of said heads having a handle secured thereto, a pair of oppositely disposed stops secured to said bottom, said stops extending upwardly from said bottom and defining said open position, a gate with a pair of openings, said gate being hingedly secured to said froat portion of said base support and movable between an open position and a closed position, said handles being accessible when said gate is in said open position, said posts being rotated from said open position to said locked position, said handles abutting said stops respectively when said posts are in said open position, said handles being in said openings when said handles are in said locked position and said gate is in said closed position.

15. A universal pedestal for a vehicle seat comprising a base plate and a seat support, said seat support being positioned over and secured to said base plate, said seat support being adapted to be secured to a vehicle seat, said base plate having a surface with front and rear portions, and a pair of elongated side flats adapted to be secured to the floor of a vehicle, said surface being higher than said flats, said seat support having a fastener and latch removably securing said base plate and seat support together whereby said seat support and said base plate can be separated and secured together as desireo, said seat support having a top and a bottom and opposite sides, said top and bottom having front and rear portions, said fastener comprises an elongated alignment flat extending rearwardly and generally downwardly from said rear portion of said bottom, said base plate having an elongated slot, said slot extending through said rear portion of said surface whereby said flat can be positioned in said slot when said base support is supported over said base plate, said latch is at least one threaded fastener.

* * * * *